United States Patent
Nimbalker et al.

(10) Patent No.: US 9,130,784 B2
(45) Date of Patent: Sep. 8, 2015

(54) METHOD AND APPARATUS FOR ENHANCED MODULATION IN A WIRLESS COMMUNICATION SYSTEM

(71) Applicant: MOTOROLA MOBILITY LLC, Libertyville, IL (US)

(72) Inventors: Ajit Nimbalker, Buffalo Grove, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 223 days.

(21) Appl. No.: 13/949,349

(22) Filed: Jul. 24, 2013

(65) Prior Publication Data
US 2014/0313985 A1    Oct. 23, 2014

Related U.S. Application Data

(60) Provisional application No. 61/814,421, filed on Apr. 22, 2013.

(51) Int. Cl.
*H04W 4/00* (2009.01)
*H04L 27/00* (2006.01)
*H04W 72/04* (2009.01)
*H04L 1/00* (2006.01)

(52) U.S. Cl.
CPC .......... *H04L 27/0012* (2013.01); *H04L 1/0003* (2013.01); *H04L 1/0016* (2013.01); *H04L 1/0025* (2013.01); *H04L 1/0031* (2013.01); *H04L 1/0061* (2013.01); *H04L 27/0008* (2013.01); *H04W 72/042* (2013.01); *H04L 1/0036* (2013.01)

(58) Field of Classification Search
None
See application file for complete search history.

(56) References Cited

U.S. PATENT DOCUMENTS

| 8,310,981 | B2 * | 11/2012 | Damnjanovic et al. | 370/319 |
|---|---|---|---|---|
| 8,385,284 | B2 | 2/2013 | Wengerter et al. | |
| 8,737,329 | B2 * | 5/2014 | Ogawa et al. | 370/329 |
| 2010/0118836 | A1 * | 5/2010 | Kazmi et al. | 370/336 |
| 2010/0135220 | A1 * | 6/2010 | Bergstrom et al. | 370/329 |
| 2011/0299484 | A1 * | 12/2011 | Nam et al. | 370/329 |
| 2012/0224555 | A1 * | 9/2012 | Lee et al. | 370/329 |
| 2013/0083737 | A1 * | 4/2013 | Earnshaw et al. | 370/329 |

(Continued)

FOREIGN PATENT DOCUMENTS

| EP | 1845742 A1 | 10/2007 |
|---|---|---|
| WO | 2012119549 A1 | 9/2012 |

OTHER PUBLICATIONS

Motorola: "PDCCH Scheduling Assignment Field Definition (MCS, RV, NDI)", 3GPP TSG RAN1 #51bis, R1-080436, Sevilla, Spain, Jan. 14-18, 2008, all pages.

(Continued)

*Primary Examiner* — Otis L Thompson, Jr.
(74) *Attorney, Agent, or Firm* — Morris & Kamlay LLP (57) ABSTRACT

Disclosed are methods for facilitating enhanced modulation (such as 256-QAM) in wireless networks. The methods generally involve enhancements to physical-layer signaling (such as enhanced MCS tables), enhancements to transport-block tables (to support enhanced MCS values), CSI-feedback enhancements (to ensure that the UE signals the appropriate MCS for enhanced modulation), enhancements to higher-layer signaling, allowing UEs to signal their ability to use the enhanced modulation, and UE category enhancements.

20 Claims, 7 Drawing Sheets

(56) References Cited

U.S. PATENT DOCUMENTS

| | | | |
|---|---|---|---|
| 2013/0114455 A1* | 5/2013 | Yoo et al. | 370/252 |
| 2013/0176952 A1* | 7/2013 | Shin et al. | 370/329 |
| 2013/0265934 A1* | 10/2013 | Zeng et al. | 370/315 |
| 2013/0272214 A1* | 10/2013 | Zhu et al. | 370/329 |
| 2014/0169297 A1* | 6/2014 | Kim et al. | 370/329 |
| 2014/0169300 A1* | 6/2014 | Kim et al. | 370/329 |
| 2014/0204849 A1* | 7/2014 | Chen et al. | 370/329 |
| 2014/0247778 A1* | 9/2014 | Gomadam | 370/329 |
| 2014/0301306 A1* | 10/2014 | Kim et al. | 370/329 |
| 2014/0348141 A1* | 11/2014 | Zhou et al. | 370/336 |
| 2014/0376488 A1* | 12/2014 | Saarinen et al. | 370/329 |
| 2015/0029989 A1* | 1/2015 | Shiizaki et al. | 370/329 |
| 2015/0036590 A1* | 2/2015 | Lahetkangas et al. | 370/328 |

OTHER PUBLICATIONS

"3rd Generation Partnership Project; Technical Specification Group Radio Access Network; Evolved Universal Terrestrial Radio Access (E-UTRA); Multiplexing and channel coding (Release 11)"; 3GPP Standard; 3GPP TS.36.212, 3rd Generation Partnership Project (3GPP), Mobile Competence Centre; 650, Routes Des Lucioles; F-06921 Sophia-Antipolis Cedex; France, vol. RAN WG1, No. V11.2.0, Mar. 12, 2013, pp. 1-82, XP050692112.

"3rd Generation Partnership Project; Technical Specification Group Radio Access Network; Evolved Universal Terrestrial Radio Access (E-UTRA); Physical layer procedures (Release 11)"; 3GPP Standard; 3GPP TS 36.213, 3rd Generation Partnership Project (3GPP); Mobile Competence Centre; 650, Routes Des Lucioles; F-06921 Sophia-Antipolis Cedex; France, vol. RAN WG1, No. V11.2.0, Mar. 15, 2013, pp. 1-173, XP050692225.

"Discussion on 256QAM in small cell scenarios"; 3GPP Draft; R1-131146 Discussion on 256QAM In Small Cell Scenarios (3), 3rd Generation Partnership Project (3GPP); Mobile Competence Centre; 650, Routes Des Lucioles; F-06921 Sophia-Antipolis Cedex; France, vol. RAN WG1, No. Chicago, USA; 20130415-20130419, Apr. 5, 2013; USA.

Motorola: "PDCCH Scheduling Assignment Field Definition (MCS, RV, NDI)"; 3GPP Draft; R1-080436—PDCCH SA Field Definition (MCS RV NDI), 3rd Generation Partnership Project (3GPP), Mobile Competence Centre; 650, Routes Des Lucioles; F-06921 Sophia-Antipolis Cedex; France, vol. RAN WG1, No. Sevilla, Spain, 200800119; Jan. 19, 2008; Spain.

International Search Report mailed Sep. 10, 2014 in corresponding International Application No. PCT/US2014/003492.

* cited by examiner

METHOD AND APPARATUS FOR ENHANCED MODULATION IN A WIRLESS COMMUNICATION SYSTEM

CROSS-REFERENCE TO RELATED APPLICATIONS

The present application claims priority to U.S. Provisional Patent Application 61/814,421, filed on Apr. 22, 2013, the contents of which are incorporated herein by reference in their entirety.

FIELD OF THE DISCLOSURE

The present disclosure is related generally to wireless network communications and, more particularly, to modulation schemes in wireless networks.

BACKGROUND

Enhanced modulation schemes—those having an order higher than 64-Quadrature Amplitude Modulation ("QAM")—will eventually be deployed in mobile networks. The motivation for this is that mobile networks can offer better performance using enhanced modulation schemes (e.g., 256-QAM) than when using lower order modulation schemes (e.g., 64-QAM). For example, using an enhanced modulation scheme increases a mobile network's spectral efficiency.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The physical-layer signaling and higher-layer signaling currently employed by mobile networks such as Long Term Evolution ("LTE") networks is currently not adequate to accommodate enhanced modulation schemes such as 256-QAM.

The present disclosure describes techniques for allowing mobile networks such as LTE networks to accommodate higher-order modulation. These techniques include: (1) Enhancements to physical layer signaling—e.g., new bits in the Downlink Control Information ("DCI") format or a redefinition of existing bits in the DCI format; (2) Transport block table enhancements to support enhanced Modulation Coding Scheme ("MCS") values in order to take advantage of increased spectral efficiency gains; (3) Channel State Information ("CSI") feedback enhancements to ensure UE reporting of suitable MCS values; (4) Enhancements to higher-layer signaling, such as enabling or disabling of Higher-Order Modulation, and providing UE capability interaction; and (5) UE category enhancements, such as identifying the capability to use an increased data rate.

Figure 1:
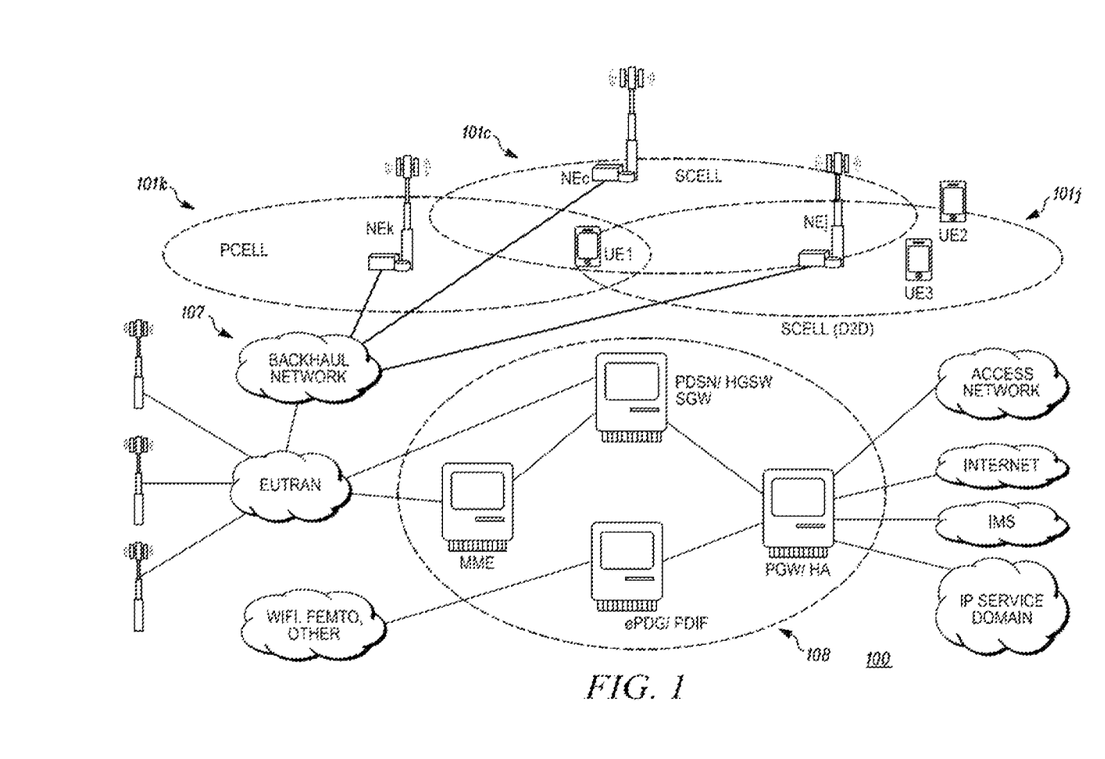
FIG. 1 is an overview of a representative communication system in which the methods of this disclosure may be practiced.

Referring to FIG. 1, the representative wireless communication network 100 is configured to use one or more Radio Access Technologies, examples of which include an Evolved Universal Terrestrial Radio Access ("E-UTRA"), Institute of Electrical and Electronics Engineers ("IEEE") 802.11, and IEEE 802.16. The network 100 includes a first cell 101$k$, a second cell 101$j$, and a third cell 101$c$. First cell 101$k$ is managed by a first Network Entity NEk, second cell 101$j$ is managed by a second network entity NEj, and third cell 101$c$ is managed by a third network entity NEc. Possible implementations of cells 101$k$, 101$j$, and 101$c$ include a macrocell, a femtocell, a picocell, and a wireless access point.

Also shown in FIG. 1 are UE1, UE2, and UE3. Each of the UEs is in communication with the network 100 via one or more of the network entities, either in an active mode or an idle mode. Possible implementations of a UE include a mobile phone, a tablet computer, a laptop, and an Machine-to-Machine device.

Communication between a network entity and a UE typically occurs when the UE is located within the network entity's cell. For example, each of NEk, NEj, and NEc can transmit signals to and receive signals from UE1. NEj would typically communicate with UE2 and UE3.

The term "cell" refers either to the geographical area covered by a network entity or to the network entity itself. The context in which the term is used indicates its meaning. For example, when a UE is said to be transmitting to a cell, it means that the UE is transmitting to the network entity that controls the cell. When a UE is said to be in a cell, the term "cell" refers to the geographical area. In the geographical sense, a sector is a type of cell.

A "virtual cell" is a cell that is created as a result of multiple network entities cooperating. A UE generally does not perceive any distinction between a virtual cell and a non-virtual cell.

The term "network entity" as used herein refers to hardware and software that operate as part of the infrastructure of a network. Examples include an E-UTRA base station, an evolved Node B ("eNB"), a Transmission Point ("TP"), a Remote Radio Head, a Home evolved Node B, a relay node, an 802.11 Access Point, and an IEEE 802.16 base station.

A network entity can be made of multiple network entities. For example, two base stations can operate in conjunction with one another to operate as a single network entity.

A network entity can be a sub-portion of another network entity. For example, a base station (a type of network entity) can control multiple cells, each of which is controlled by certain resources of the base station. Each set of resources (e.g., each antenna array along with the equipment that controls it) can be a separate network entity.

In some embodiments of the disclosure, a single network entity controls two or more of the cells of FIG. 1. In some embodiments, multiple network entities coordinate with one another, e.g., when using Carrier Aggregation ("CA") or Coordinated Multipoint communication ("CoMP").

The cells, network entities, and UEs of FIG. 1 are only representative and are intended to facilitate description. In fact, the network 100 likely has many cells and network entities, and is in communication with many UEs. For example, if the network 100 is an LTE network, it includes many eNBs that control many macrocells. Many users movie within and between those macrocells, and the mobile devices of the users frequently connect to one or more of the macrocells.

The network 100 also includes a backhaul network 107. The backhaul network 107 includes wired and wireless infrastructure elements that carry signals around various parts of the network 100 and among the cells. Examples of infrastructure elements include fiber-optic lines and wireless microwave links. The network 100 also includes a core network 108 that controls the operation of the network 100 using various resources, including billing systems, home-location registers, and Internet gateways. Several core resources are depicted in FIG. 1. In an LTE implementation, resources of the core network 108 communicate with network entities over an Evolved Universal Mobile Telecommunications System Terrestrial Radio Access Network. The core network resources also communicate with other networks.

Figure 2:
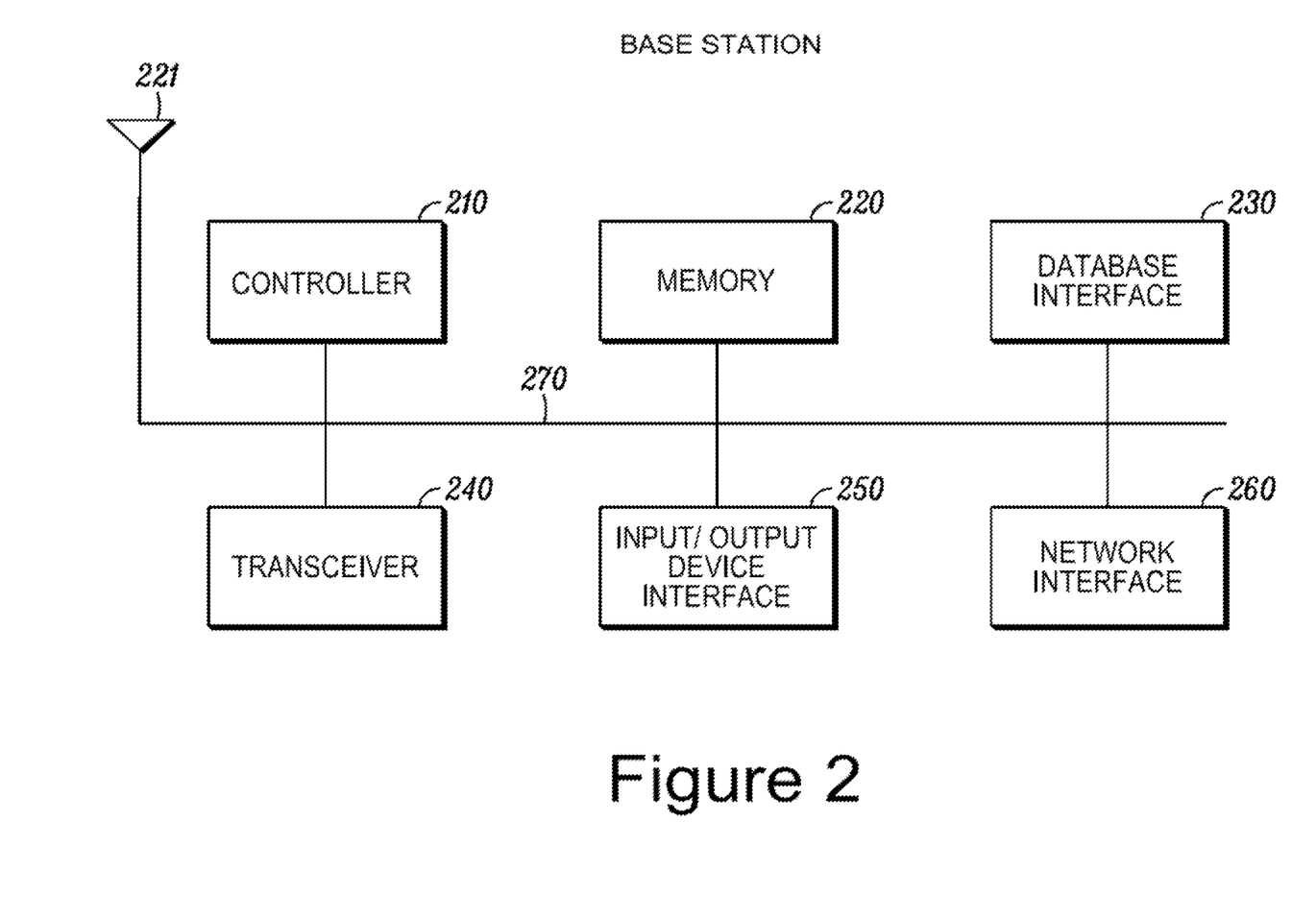
FIG. 2 is a generalized schematic of a representative network entity.

FIG. 2 illustrates a configuration of a network entity in accordance with an embodiment of the disclosure. The network entity includes a controller 210, a memory 220, a database interface 230, a transceiver 240, input/output ("I/O") device interface 250, a network interface 260, and one more antennas represented by antenna 221. Each of these elements is communicatively linked to one another via one or more data pathways 270. Examples of data pathways include wires, conductive pathways on a microchip, and wireless connections.

During operation of the network entity, the transceiver 240 receives data from the controller 210 and transmits radio frequency ("RF") signals representing the data via the antenna 221. Similarly, the transceiver 240 receives RF signals via the antenna 221, converts the signals into the appropriately formatted data, and provides the data to the controller 210. The controller 210 retrieves instructions from the memory 220 and, based on those instructions, provides outgoing data to, or receives incoming data from, the transceiver 240. If needed, the controller 210 retrieves data that facilitate its operation from a database via the database interface 230 or from the memory 220. The database also contains formatting data that allow the network entity to connect to the network 100 of FIG. 1.

The network interface 260 is coupled to a backhaul interface. The controller 210 transmits data to other network entities of the network 100 of FIG. 1 via the network interface 260. The controller 210 also receives data from, and sends data to, an external device, such as an external drive, via the I/O interface 250.

Possible implementations of the network interface 260 include modems, network interface cards, and transceivers. The network connection interface 260 connects a client device to the network.

Possible implementations of the controller 210 include programmable processors, general-purpose computers, special-purpose computers, programmed microprocessors, peripheral integrated circuit elements, integrated circuits, application-specific integrated circuits, hardware logic circuits, software logic elements, discrete element circuits, programmable logic devices, programmable logic arrays, and field programmable gate-arrays.

Possible implementations of the memory 220 include volatile data storage, nonvolatile data storage, electrical memory, magnetic memory, optical memory, random access memory, cache memory, and hard drives.

The I/O device interface 250 is connected to one or more input devices. An input device is any device that accepts input. Examples of an input device include keyboards, mouse, pen-operated touch screens or monitors, and voice-recognition devices. The I/O device interface 250 is also connected to one or more output devices such as monitors, printers, disk drives, and speakers. The I/O device interface 250 is capable of receiving a data task or connection criteria from a network administrator.

According to an embodiment of the disclosure, the antenna 221 is one of a set of geographically collocated or proximal physical antenna elements linked to the one or more data paths 270. Each of the antenna elements has one or more transmitters and one or more receivers. The number of transmitters that the network entity has is related to the number of transmit antennas the network entity has. In one embodiment, the network entity has multiple antennas to support Multiple-Input Multiple-Output ("MIMO") communication.

Figure 3:
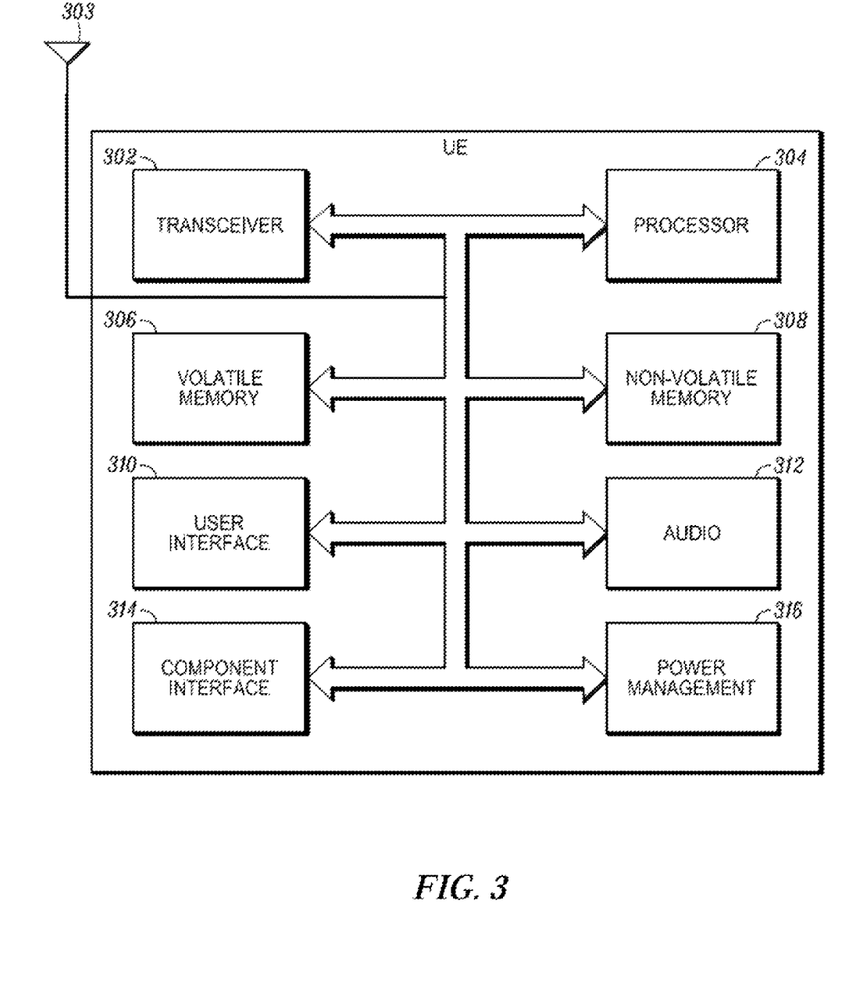
FIG. 3 is a generalized schematic of a representative User Equipment ("UE")

Turning to FIG. 3, a UE according to an embodiment of the disclosure includes a transceiver 302 capable of sending and receiving data over the network 100 of FIG. 1. The transceiver 302 is linked to one or more antennas, represented by antenna 303. In some embodiments the UE has multiple antennas that allow the UE to support MIMO communication.

The UE also includes a processor 304 that executes stored programs, a volatile memory 306, and a non-volatile memory 308. The volatile memory 306 and the non-volatile memory 308 store programs used by the processor 304. The UE includes a user interface 310 and an audio interface 312. The audio interface 312 includes such elements as microphones, earphones, and speakers. The UE also includes a component interface 314 capable of receiving one or more additional elements such as a universal serial bus interface. Finally, the UE includes a power management module 316. The power management module 316, under the control of the processor 304, controls the amount of power the transceiver 302 uses to transmit signals.

The user interface 310 includes a display screen, such as a touch-sensitive display, that displays the output of various application programs to a user. The user interface 310 additionally includes on-screen buttons that the user touches in order to cause the UE to perform a function. The processer 304 manages the display of content shown on the user interface 310. Furthermore, the user interface 310 provides information that it receives from the user to the processor 304. In response to receiving the information, the processor 304 causes the UE to carry out a function whose effects may or may not be apparent to the user.

During operation, the transceiver 302 receives data from the processor 304 and transmits RF signals representing the data via the antenna 303. Similarly, the transceiver 302 receives RF signals via the antenna 303, converts the signals into the appropriately formatted data, and provides the data to the processor 304. The processor 304 retrieves instructions from the non-volatile memory 308 and, based on those instructions, provides outgoing data to, or receives incoming data from, the transceiver 302. If needed, the processor 304 writes to, or reads from, the volatile memory 306, particularly for caching data and instructions.

In an LTE embodiment, the multiplexing or multiple-access scheme used for communication between the network entities and the UEs differs according to whether the signals are being sent in the Uplink ("UL") direction (travelling from a UE to a network entity) or in the Downlink ("DL") direction (travelling from a network entity to a UE). LTE typically uses a multiple-access protocol called Orthogonal Frequency-Division Multiple Access in the DL direction and Single Carrier Frequency Division Multiple Access or Discrete Fourier Transform-Spread Orthogonal Frequency-Division Multiple Access in the UL direction. In an LTE implementation, the aggregated channel bandwidth of the UL or DL carriers varies depending upon whether CA is being used. The maximum bandwidth is 20 MHz without CA, and 100 MHz with CA.

Figure 4A:
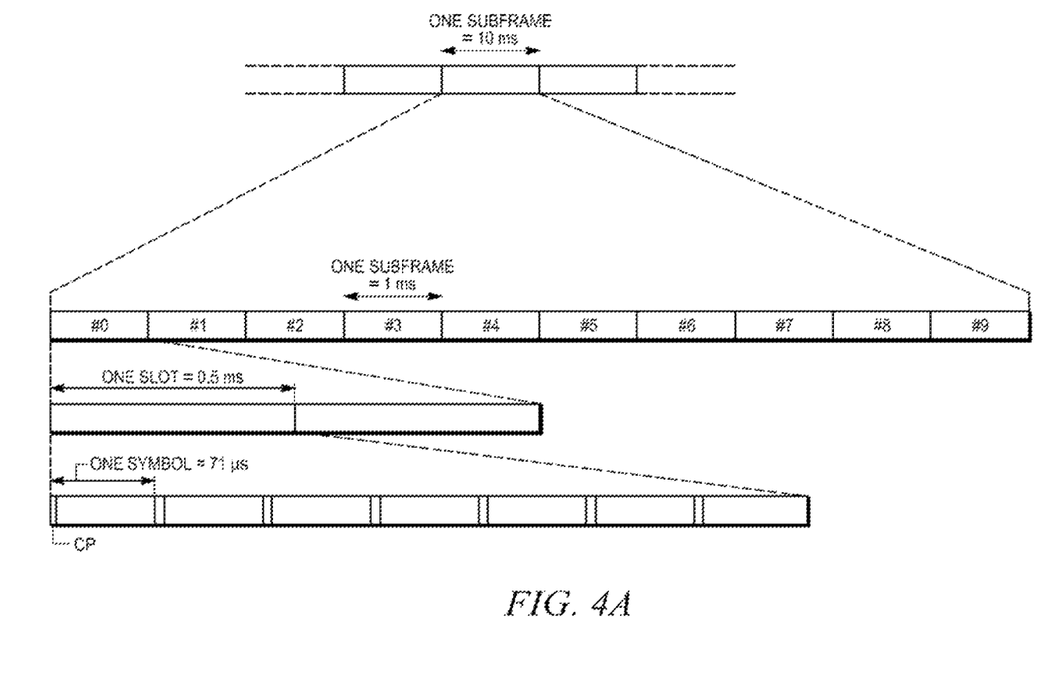
FIG. 4A shows a representative radio-frame structure.
Figure 4B:
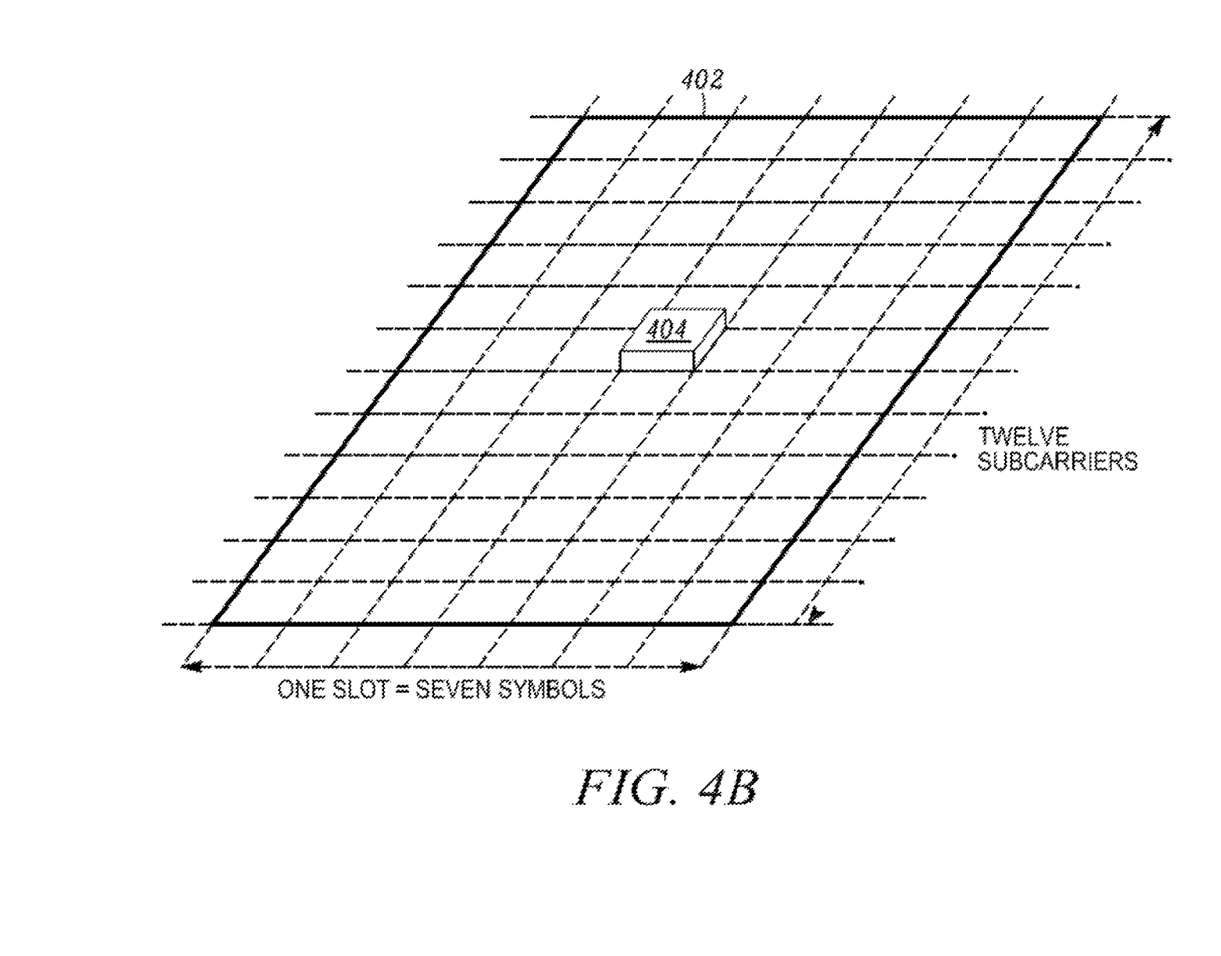
FIG. 4B shows the format of a resource block.

FIG. 4A shows a representative structure of an LTE frame used for carrying data between the UEs and the network entities on both UL carriers and DL carriers. In LTE operation, both UL and DL radio frames are each 10 milliseconds ("ms") long and are divided into ten subframes, each of 1 ms duration. Each subframe is divided into two slots of 0.5 ms each. Each slot contains a number of Orthogonal Frequency-Division Multiplexing ("OFDM") symbols, and each OFDM symbol may have a Cyclic Prefix ("CP"). The duration of a CP varies according to the format chosen (normal or extended CP), but is about 4.7 microseconds in the example of FIG. 4A, with the entire symbol being about 71 microseconds. In the context of time-frequency, the subframe is divided into units of Resource Blocks ("RBs"), as shown in FIG. 4B. When a normal CP is used, each RB 402 is 12 subcarriers by 7 symbols (one slot). Each RB (when a normal CP is used), in turn, is composed of 84 Resource Elements ("REs") 404. Each RE is 1 subcarrier by 1 symbol. However, RBs and REs may be other sizes in other embodiments. Thus, the terms RE and RB cover time-frequency resources of any size. In LTE, an RB or an RB pair is the typical unit to which resource allocations are assigned for UL and DL communications.

The UEs receive DCI in a control region, either on a Physical Downlink Control Channel ("PDCCH") or on an Enhanced PDCCH ("EPDCCH"). There are various types of DCI Formats for carrying a variety of control information. For example, the DCI Format 0 is used to schedule uplink transmissions and typically has scheduling information fields such as an MCS index, RB allocation, Hopping flag, New Data Indicator, Transmit Power Control command, or Hybrid Automatic Repeat reQuest ("HARQ") information. The user identification or user ID is typically embedded within the Cyclic Redundancy Check ("CRC") bits. The DCI Format 1A is a compact scheduling grant used to schedule a single transport block and includes fields similar to those in DCI Format 0 plus additional fields such as Redundancy Version ("RV"). DCI Format 2A is used to schedule two transport blocks in the downlink using open-loop MIMO, whereas DCI Format 2B is used to schedule two transport blocks in the DL using closed-loop MIMO and a cell-specific reference signal ("CRS"). DCI Format 2C is used for scheduling DL transmissions in transmission mode 9, where up to two transport blocks may be scheduled using a Demodulation Reference Signal ("DM-RS"). For each DCI format, a CRC is attached, and a user ID or a Radio Network Temporary Identifier is embedded into the CRC-attached DCI format, which is then encoded using a convolutional encoder. The resulting stream is rate-matched and prepared for transmission.

Figure 5:
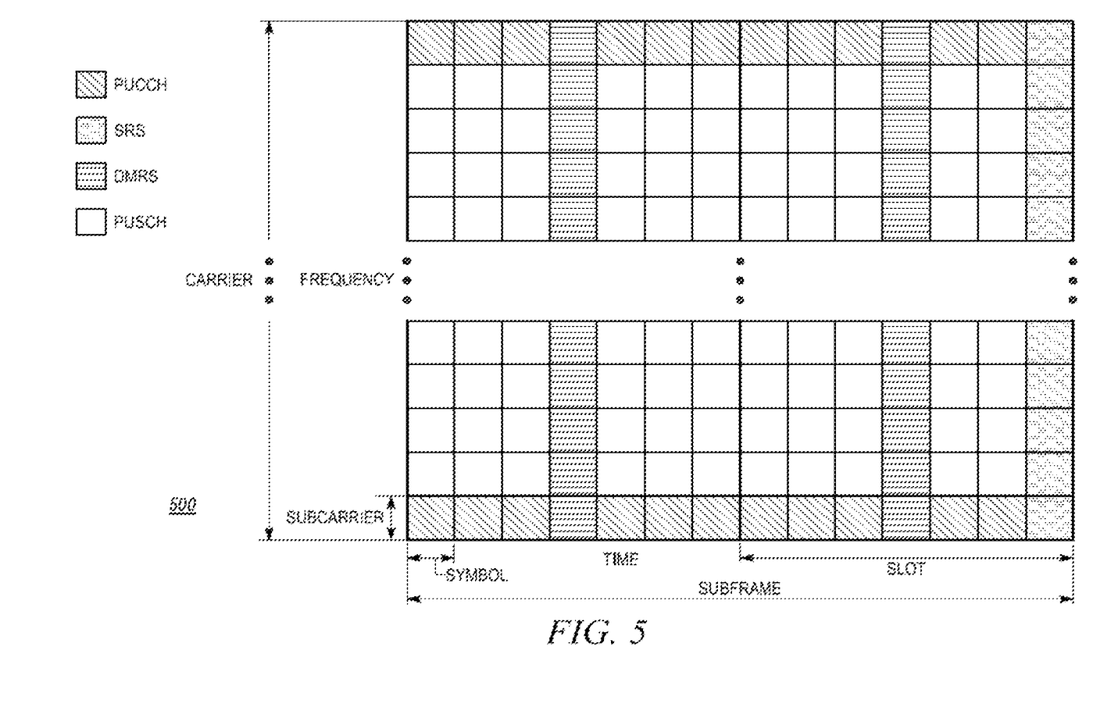
FIG. 5 shows the format of a representative uplink subframe.

FIG. 5 shows a representative structure of an LTE UL subframe used to carry data from UEs to network entities over a UL carrier.

In an LTE embodiment, a UE transmits data and certain types of control information to the network entity on a Physical Uplink Shared CHannel ("PUSCH"). The UE transmits control information to the network entity on a Physical Uplink Control CHannel ("PUCCH"). Data carried by the PUSCH includes user data such as video data (e.g., streaming video) or audio data (e.g., voice calls). A UE may also transmit control information on the PUSCH, such as HARQ-Acknowledgement ("HARQ-ACK") feedback, and CSI reports.

Each CSI report sent by a UE may include one or more of a Channel Quality Indicator ("CQI"), a Precoding Matrix Indicator ("PMI"), a Precoder Type Indication ("PTI"), and a Rank Indicator ("RI"). The UE uses the CQI to indicate the highest MCS that, if used, would result in DL transmissions having a block-error rate of no more than, for example, 10%. The UE uses the PMI to indicate, to the network entity, a recommended precoder matrix for the DL transmissions. The UE uses the RI to recommend the transmission rank (number of transmission layers) that is preferably to be used for DL transmission to the UE. The PTI distinguishes slow-fading environments from fast-fading environments.

The control information transmitted by a UE on the PUCCH includes HARQ-ACK feedback, Scheduling Request ("SR"), and CSI reports. The UE sends HARQ-ACK feedback in order to acknowledge or negatively acknowledge data that the UE receives from a network entity. The UE uses an SR to request UL resources from the network 100, including from one or more network entities. CSI reports are used by a UE to report, to a network entity, information regarding the DL transmission channel as seen from the point of view of the UE.

A UE transmits one or both of a UL DM-RS and a Sounding Reference Signal ("SRS") during communication with the network. The network entity uses the UL DM-RS for channel estimation to enable coherent demodulation of the PUSCH and PUCCH. The network entity uses the SRS by for channel state estimation to support, for example, uplink channel-dependent scheduling and link adaptation.

Figure 6:
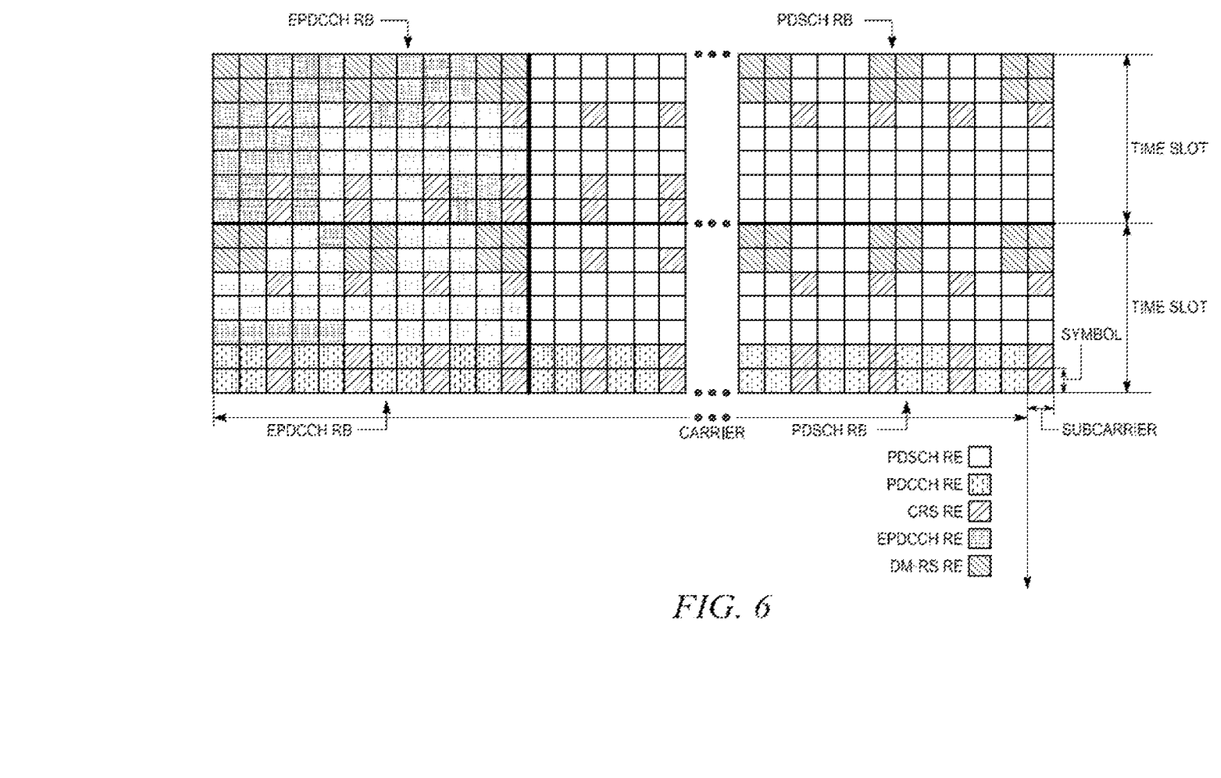
FIG. 6 shows the format of a representative downlink subframe.

Referring to FIG. 6, a structure of a DL subframe used for carrying data from one or more network entities to a UE on a DL carrier is now described. The frequency axis is divided into subcarriers. The time axis is divided into symbols. The sub frame is divided into RBs.

A network entity transmits several types of reference signals on the DL subframe. One such reference signal is a CSI Reference Signal ("CSI-RS"), which is used by the UE to determine CSI. The network entity provides the CSI-RS configuration to the UE via Radio Resource Control ("RRC") signaling. The RRC layer in the UE provides the CSI-RS configuration information to the physical layer in the UE (e.g., "higher-layer signaling"). The UE reports CSI to the network entity. The CSI-RS is not necessarily transmitted in all subframes.

Referring again to FIG. 6, other reference signals on the DL subframe include the DM-RS, with the REs being referred to as DM-RS REs. Typically, reference signals corresponding to antenna ports 7 and 8 are multiplexed using Code Division Multiplexing or another scheme and are mapped to the same REs in time and frequency domain. The subframe can also include other reference signals such as CRS, positioning reference signal, and primary and secondary synchronization signals that are distributed in the control regions and user data regions of the sub-frame.

As previously noted a UE, in an embodiment of the disclosure, requests uplink resources from the network by transmitting an SR to the network entity. Referring to FIG. 6, if the network entity grants the request, then it responds by sending a scheduling grant to the UE. A scheduling grant is part of the DCI. The network entity transmits the DCI on the PDCCH. The scheduling grant provides the UE with parameters that the UE uses to transmit data on the PUSCH. These parameters include a data MCS, the Transport Block Size ("TBS"), a resource allocation, hopping parameters, power control information, and other control information. Examples of resources that can be allocated include RBs and bandwidth (transmission bandwidth) within the transmission bandwidth configuration.

In current versions of LTE, the DCI transmitted by a network entity indicates the number of assigned RBs and includes a five-bit MCS index. Each MCS index corresponds to a nominal spectral efficiency, which in turn corresponds to an associated TBS and modulation order for each quantity of assigned RBs. Using the RBs and MCS index, the UE determines the associated TBS based on a Look-Up Table ("LUT"), modulation order, etc. The UE then decodes a received transmission based on the determined TBS and on other control information included in the DCI.

For MCS0 through MCS28, each MCS index corresponds to an associated modulation order and a transport block ("TB") index. The UE references a LUT using the TB index and the number of RBs to determine the TBS. The LUT is designed assuming a nominal spectral efficiency. MCS29, MCS30, MCS31 are reserved for signaling the modulation order for Hybrid Acknowledge HARQ retransmissions of TBs for the downlink communication.

In LTE Releases ("Rel") 8, 9, and 10, a UE determines the TBS (which translates to a corresponding data rate) associated with a Physical Downlink Shared Channel ("PDSCH") or a PUSCH based on the DCI. The DCI indicates a number of assigned RBs and an MCS index. The UE determines the associated TBS using a TBS LUT. The LUT maps the number of RBs and MCS index to the TBS.

The LUT in LTE Releases 8, 9, and 10 was designed assuming a reference configuration having a Physical Control Format Indicator Channel ("PCFICH") of 3, four CRS ports, a normal subframe type, a normal CP, and a reference MCS. In practice the configurations are dynamic, varying with each sub frame. In other words, the number of REs available in a Physical Resource Block ("PRB") pair is dynamic.

For the sake of simplicity, however, the TBS lookup in Releases 8, 9, and 10 does not vary with the number of available REs. This is true for both UL and DL. The number of REs does vary though. For example, the number of REs ranges from 112 to about 132 for Frequency Division Duplex, with a wider range in the Downlink Pilot Time Slot region for Time Division Duplex within each of the assigned RBs. With this simplification, the current LTE specification allows the TBS to be fixed rather than having to be adjusted for every configuration. It is the coding rate (defined as TBS/[modulation×number of available REs]) that varies based on the dynamic configuration.

Although the various embodiments are frequently described in the context of an LTE cellular system, it is to be understood that the scope of the disclosure is not limited to LTE and may be implemented in other types of wireless networks (IEEE 802.11, 802.16, etc.)

One technique for supporting enhanced modulation involves joint coding of MCS (currently 5-bit) and RV (currently 2-bits) to a 7-bit MCS+RV. This supports, for example, 256-QAM, but with a restriction on some combinations of MCS/RV. However, no increase in DCI overhead is required. For example, Table 1 shows how the RV and MCS can be jointly coded to support 256-QAM. In this example, the legacy MCS indices 1-31 and RV 1, MCS29-31 and RV2/RV3 (i.e. 31+6=37 states) are "blocked" or "redefined" to free up states that are in turn used to accommodate 256-QAM (9 MCS×4 RVs=36 states). From a scheduling perspective, the "blocked" states may not be needed since the eNB can use other available MCS/RV states to schedule the TB instead.

TABLE 1

| MCS + RV jointly coded | MCS Index | Modulation Order | TBS Index | RV |
| --- | --- | --- | --- | --- |
| 0-31 | 0-31 | legacy modOrdr | legacy TBS index | 0 |
| 32 | 0 | legacy modOrdr | Legacy TBS Index | 1 |
| 33-90 | 0-28 | legacy modOrdr | legacy TBS index | 2, 3 |
| 91-94 | 32 | 8 | reserved | 0, 1, 2, 3 |
| 95-126 | 33-40 | 8 | 26-33 | 0, 1, 2, 3 |
| N/A | 1-31 | legacy modOrdr | Legacy TBS Index | 1 |
| N/A | 29-31 | legacy modOrdr | Legacy TBS Index | 2, 3 |

Joint Coding with the PDSCH RE mapping and Quasi-CoLocation ("PQI") state: Transmission Mode 10 ("TM10"), which supports CoMP transmission, defines one MCS table per PQI state, where the PQI state corresponding to the macrocell may use the LTE Release 10 MCS, whereas the PQI corresponding to TP may use an enhanced MCS table. For TM10, up to four parameter sets of PDSCH RE mapping and Quasi-CoLocation ("QCL") are configured via higher-layer signaling, and a 2-bit PQI field in the DCI is used to indicate the used parameter set for the PDSCH. In this case, a 5-bit MCS may be used as before, but the mapping to modulation order and TBS index may vary for each MCS set (e.g., each MCS set may use one of various options in Table 2).

The following parameters for determining PDSCH RE mapping and PDSCH antenna port quasi co-location are configured via higher-layer signaling for each parameter set (the bold text shows the new MCS determination to accommodate the 256-QAM MCS table):

crs-PortsCount-r11. 'Number of CRS antenna ports for PDSCH RE mapping'.
crs-FreqShift-r11. 'CRS frequency shift for PDSCH RE mapping'.
mbsfn-SubframeConfigList-r11. 'MBSFN subframe configuration for PDSCH RE mapping'.
csi-RS-ConfigZPId-r11. 'Zero-power CSI-RS resource configuration for PDSCH RE mapping'.
pdsch-Start-r11. 'PDSCH starting position for PDSCH RE mapping'.
qcl-CSI-RS-ConfigNZPId-r11. 'CSI-RS resource configuration identity for PDSCH RE mapping'.
Pdsch-MCS-Config-new. 'MCS determination used for PDSCH'

| Value of 'Pdsch-MCS-Config-new' field | Description |
| --- | --- |
| 0 | MCS set 1 (e.g., configured by higher layers) |
| 1 | MCS set 2 (e.g., configured by higher layers) |
| ... | ... |
| X | MCS set x (e.g., configured by higher layers) |

One embodiment includes an extra bit in the MCS (Option 1 in Table 2). This embodiment involves adding one extra bit to the applicable DCI formats (i.e., 5-bit becomes 6-bit MCS). This bit can be configured to be added via higher-layer signaling, e.g., configured via RRC, or it is always present in the DCI format and is utilized (or unutilized for 256-QAM MCSs) via higher-layer signaling. Option 1 in Table 2 is an example of adding support of 256-QAM. (Any unused states can be used as virtual CRC to reduce false alarms during blind decoding.) Nine new states are added to the MCS table to support 256-QAM. Eight states allow defining eight spectral efficiencies, and the ninth-state (given by MCS32) enables support of HARQ retransmissions with 256-QAM and implicit signaling of TBS. Table 2 also shows the legacy MCS index for modulation order and TBS index determination.

Another embodiment redefines the modulation order and TBS mapping (Option 2 in Table 2). If the network entity knows that the UE is in very good channel condition, it can configure the UE to use a newly defined MCS table as shown in Option 2 instead of adding an extra bit. This option "blocks" some of the existing legacy MCSs. This may not always be desirable, however.

One embodiment uses the newly defined MCS table of Option 2 when the number of assigned RBs is larger than some threshold (e.g., 6 RBs). In one implementation, the threshold number of RBs is set based on a fraction of the system bandwidth (e.g., 25% of the system bandwidth). If the number of RBs does not exceed the threshold, then the legacy MCS lookup is used.

Table 2 shows the MCS index-to-modulation order and TBS determination for three different options. According to one embodiment, each of these options is implemented as a separate table. For example, the Legacy option is a legacy table, while options 1 and 2 are enhanced tables.

TABLE 2

| | Legacy option (Rel-8 to Rel-11) | | Option 1 (example) | | Option 2 (example) | |
|---|---|---|---|---|---|---|
| MCS Index $I_{MCS}$ | Legacy Modulation Order $Q_m$ | Legacy TBS Index $I_{TBS}$ | Enhanced-Mod Order $Q_m$ | Enhanced-TBS Index $I_{TBS}$ | Enhanced-Mod Order $Q_m$ | Enhanced-TBS Index $I_{TBS}$ |
| 0 | 2 | 0 | 2 | 0 | 8 | 26 |
| 1 | 2 | 1 | 2 | 1 | 8 | 27 |
| 2 | 2 | 2 | 2 | 2 | 8 | 28 |
| 3 | 2 | 3 | 2 | 3 | 8 | 29 |
| 4 | 2 | 4 | 2 | 4 | 8 | 30 |
| 5 | 2 | 5 | 2 | 5 | 2 | 5 |
| 6 | 2 | 6 | 2 | 6 | 2 | 6 |
| 7 | 2 | 7 | 2 | 7 | 2 | 7 |
| 8 | 2 | 8 | 2 | 8 | 2 | 8 |
| 9 | 2 | 9 | 2 | 9 | 8 | 31 |
| 10 | 4 | 9 | 4 | 9 | 4 | 9 |
| 11 | 4 | 10 | 4 | 10 | 4 | 10 |
| 12 | 4 | 11 | 4 | 11 | 4 | 11 |
| 13 | 4 | 12 | 4 | 12 | 4 | 12 |
| 14 | 4 | 13 | 4 | 13 | 4 | 13 |
| 15 | 4 | 14 | 4 | 14 | 4 | 14 |
| 16 | 4 | 15 | 4 | 15 | 8 | 32 |
| 17 | 6 | 15 | 6 | 15 | 8 | 33 |
| 18 | 6 | 16 | 6 | 16 | 6 | 16 |
| 19 | 6 | 17 | 6 | 17 | 6 | 17 |
| 20 | 6 | 18 | 6 | 18 | 6 | 18 |
| 21 | 6 | 19 | 6 | 19 | 6 | 19 |
| 22 | 6 | 20 | 6 | 20 | 6 | 20 |
| 23 | 6 | 21 | 6 | 21 | 6 | 21 |
| 24 | 6 | 22 | 6 | 22 | 6 | 22 |
| 25 | 6 | 23 | 6 | 23 | 6 | 23 |
| 26 | 6 | 24 | 6 | 24 | 6 | 24 |
| 27 | 6 | 25 | 6 | 25 | 6 | 25 |
| 28 | 6 | 26 | 6 | 26 | 6 | 26 |
| 29 | 2 | reserved | 2 | reserved | 8 | reserved |
| 30 | 4 | reserved | 4 | reserved | 4 | reserved |
| 31 | 6 | reserved | 6 | reserved | 6 | reserved |
| 32 | N/A | N/A | 8 | reserved | N/A | N/A |
| 33 | N/A | N/A | 8 | 26 | N/A | N/A |
| 34 | N/A | N/A | 8 | 27 | N/A | N/A |
| 34 | N/A | N/A | 8 | 28 | N/A | N/A |
| 36 | N/A | N/A | 8 | 29 | N/A | N/A |
| 37 | N/A | N/A | 8 | 30 | N/A | N/A |
| 38 | N/A | N/A | 8 | 31 | N/A | N/A |
| 39 | N/A | N/A | 8 | 32 | N/A | N/A |
| 40 | N/A | N/A | 8 | 33 | N/A | N/A |
| 41~63 | N/A | N/A | reserved | reserved | N/A | N/A |

The introduction of 256-QAM increases the range of potentially supported MCSs. Currently (up to Rel-11), the nominal spectral efficiency in LTE is approximately 5.55 bps/Hz (with 64-QAM and a 948/1024 coding rate). Using 256-QAM increases the nominal spectral efficiency to approximately 8×0.93=7.44 bps/Hz. Using MCS for CQI in steps of 1.8 dB (the TBS design principle used in LTE Rel-8), 256-QAM supports MCSs of the set {5.7752 6.000 6.2504 6.500 6.800 7.100 7.444}. In principle, 256-QAM with a 0.96 code rate supports an additional MCS of 7.68. In practice, an MCS of 7.68 would not be used or would be used only for extremely low-overhead data transmissions.

Given a set of TBSs, the TBS that yields a spectral efficiency closest to the nominal spectral efficiency $\eta_{SE}$ can be determined in the manner set forth in Rel-8:

$$\left( \frac{TBS + CRCoverhead}{N_{PRB}^{RE} \times N_{PRB}} \right) \approx \eta_{SE}$$

where $\eta_{SE}$ is the nominal spectral efficiency, $N_{PRB}$ is the number of RBs (e.g., a value between 1 and 110), $N_{PRB}^{RE}$ is the reference number of REs per RB, and CRCoverhead is the CRC for a given TBS, which can be calculated based on the code-block segmentation rule set forth in Rel-11.

In Rel-10, a TB is typically mapped to one, two, three, or four spatial layers. Whether or not a UE supports TBs mapped to multiple spatial layers depends on the UE's capability and its category. Thus, there are many options for determining the TBS for one layer when using 256-QAM. One option is to include in the TBS set only the 1-layer TBS sizes that are set forth in the Rel-11 specification. A second option is to include, in the TBS set, all of the TBS sizes (1-layer, 2-layer, 3-layer, 4-layer) set forth in the Rel-11 specification. A third option is to include in the TBS set only the 1-layer and 2-layer TBS sizes set forth in the Rel-11 specification. The third option, however, yields the same TBS tables as the second option.

Assuming 256-QAM and 100 Reference Signal ("RSs"), Table 3 shows the TBS that yields a spectral efficiency that is the closest to 7.44 bps/Hz for different values of $N_{PRB}^{RE}$ using the first two options above. The percentage value is the increase in data rate of the second option over the first option (1-layer TBS limited to 75376).

TABLE 3

| $N_{PRB}^{RE}$ | 1-layer TBS-only | 1,2,3,4-layer TBS-only | Comment |
|---|---|---|---|
| 120 | 75376 | 87936 (16%) | $N_{PRB}^{RE} = 120$ is the same assumption as Rel-8 TBS design (PCFICH = 3, 4 CRS ports) |
| 144 | 75376 | 105528 (40%) | $N_{PRB}^{RE} = 144$ is assuming, e.g., 24 DM-RS REs per PRB pair, may be more suitable for Rel-12 NCT |
| 156 | 75376 | 115040 (53%) | $N_{PRB}^{RE} = 156$ may be more suitable, e.g., for Rel-12 NCT and small cell where there may be only 12 DMREs/PRB pair |
| 164 | 75376 | 119816 (59%) | $N_{PRB}^{RE} = 164$ may be more suitable, e.g., for Rel-12 NCT and small cell where there may be only 4 DMREs/PRB pair for increased spectral efficiency |

The one-layer TBS design for new spectral efficiencies corresponding to 256-QAM and for different assumptions of the reference number of REs per PRB pair (one of 120, 144, 156, 164) and for different assumptions of the one-layer TBS values in the set (one of 1-layer, 1,2-layer and 1,2,3,4-layer TBSs) are shown in the spreadsheets in the Annex. For each sheet, the format of the table is as follows: (1) nRE denotes the reference number of REs per PRB pair used to derive the corresponding TBS table, (2) Ltbs denotes the set of TBSs used to derive the TBS for new 1-layer spectral efficiencies (256-QAM spectral efficiencies), (a) Ltbs=1=>Include in the TBS set only the 1-layer TBS sizes from Rel-11 specification, (b) Ltbs=4=>Include in the TBS set all the TBS sizes (1-layer, 2-layer, 3-layer, 4-layer) from the Rel-11 specification, (3) SE is spectral efficiency, (4) ITBS denotes the TBS index (similar to Rel-11 spec 36.213), MS denotes modulation symbol (8=>256-QAM), and (5) nRB denotes number of RBs or RB pairs.

The end of each table shows the 1-layer to 2-layer TBS translation, the 1-layer to 3-layer TBS translation, and the 1-layer to 4-layer translation for the new 1-layer TBS values determined for the 256-QAM spectral efficiencies. Note that the new translations may be appended to (or used in conjunction with) existing translation tables in the Rel-11 specification. (Please refer to Table 4 in the Annex.)

The various nRE-Ltbs combinations given in the Annex cover some of the scenarios that may be used to optimize the 256-QAM enhancements set forth by the 3rd Generation Partnership Project ("3GPP") RAN1 ("Radio Layer 1") working group.

256-QAM can provide a 16% to 60% increase in the data rate for a 20 MHz downlink data channel, depending on the overhead of the channel.

An embodiment of the disclosure uses a mixed MCS design. If one new extra MCS bit is added in the DCI for Rel-12 to support 256-QAM, then it is possible to use some additional MCS signaling states to add support for additional reference REs/PRB pairs and for the spectral efficiency pairs set forth in the Rel-12 standard. In other words, the results from the various spectral efficiencies per number of reference REs per PRB pair may be used create a finer granularity TBS lookup.

An example is shown in Table 5 (please see the Annex). The first two columns indicate the corresponding reference REs per PRB pair and the spectral efficiency targeted. These two columns need not be explicitly included in any particular implementation.

In LTE, TBS translation tables are used to determine the TBSs mapped to more than one spatial layer in MIMO TMs. For a TB mapped to m layers (m=2, 3, or 4), for a given number of RBs and a given MCS index, the UE determines a baseline TBS from the one-layer TBS lookup and translates it to an m-layer TBS using a TBS translation table (e.g., TBS_L2 for 2-layer, TBS_L3 for 3-layer, and TBS_L4 for 4-layer). For the new 256-QAM one-layer TBSs, new pairs or values for (TBS_L1, TBS_Lm), where m=2,3,4 are required.

Table 6 is a translation table used to determine the TBSs mapped to more than one spatial layer. Table 6 include new TBSs at the higher end (>300,000). It is to be noted that many of the new TBSs (305592, 317064, 305144, 326104, 353976, 375320, 408928) yield two Quadratic Polynomial Permutation ("QPP") interleaver sizes when code-block segmentation is considered. This is not very desirable because it is inconsistent with Rel-8, Rel-9, Rel-10, and Rel-11 TBSs, which lead to a single QPP interleaver size per TBS after code-block segmentation (as described below). A technique of the present disclosure introduces TBSs that result in a single QPP interleaver per TBS after code-block segmentation.

TABLE 6

| TBS_L1 | TBS_L2 | TBS_L3 | TBS_L4 |
|---|---|---|---|
| 76208 | 152976 | 230104 | 305920 |
| 78704 | 157432 | 236160 | 314832 |
| 81176 | 161760 | 245648 | 324336 |
| 84760 | 169544 | 254328 | 339056 |
| 87936 | 175600 | 266440 | 351224 |
| 90816 | 181656 | 275376 | 363280 |
| 93800 | 187712 | 284608 | 375392 |
| 97896 | 195816 | 293736 | 391600 |
| 101840 | 203704 | 305920 | 405728 |
| 105528 | 211936 | 318160 | 422200 |
| 110136 | 220296 | 330408 | 440560 |
| 115040 | 230104 | 345120 | 460176 |
| 119816 | 236160 | 36100 | 478400 |
| 124464 | 245648 | 373296 | 496568 |
| 128496 | 254328 | 385488 | 51400 |
| 133208 | 266440 | 399624 | 532848 |
| 137792 | 275376 | 411784 | 545016 |

Before a device transmits a set of TBs, its physical layer attaches a 24-bit CRC to each TB. The CRC allows the receiving device to verify that it has correctly received the TB. The receiving device also uses the CRC to generate a HARQ ACK/NACK feedback message.

The physical layer of the transmitting device then segments the TB into code blocks according to a segmentation rule. The segmentation rule is designed to minimize, for a given TBS, the number of filler bits needed to match the available forward error correction block sizes—e.g., the LTE turbo code internal interleaver QPP sizes (max size=6144 bits). The segmentation rule permits the transmitting device to use two adjacent interleaver sizes when it segments a transport block rather than restricting the transmitting device to using a single interleaver size.

If physical layer splits the TB into two or more code blocks, then the physical layer inserts the filler bits (if there are any) into the first code block. Following segmentation, the physical layer attaches an additional CRC—a 24-bit code block CRC—to each code block. Thus, the physical layer attaches no filler bits to the transport blocks or to the code blocks. On the other hand, the physical layer does insert transport block CRC bits and code block CRC bits.

In the LTE specifications, however, the set of possible transport block sizes may be restricted such that the segmentation rule described above always results in a single interleaver size for each code block of a transport block with no filler bits. Therefore, the present technique, which yields a single interleaver size per TB size, yields a different translation table for three- and four-layer transport-block size determination.

According to an embodiment of the disclosure, a technique for enhancing CSI feedback helps to ensure that a UE reports MCS values that are suitable in a 256-QAM-capable network. In this embodiment, the network entity uses higher-layer signaling to enable 256-QAM for DL communication. The network entity also uses RRC signaling to configure the UE to report CSI such that it takes into account 256-QAM when considering MCSs.

In one embodiment, the network entity allocates CSI bits on a per-CSI process basis. In one implementation, the network entity allocates four bits for periodic CSI and five bits for aperiodic CSI. Thus, the CQI table for periodic CSI has a coarser granularity in order to accommodate 256-QAM.

In an embodiment, the network entity decimates the existing CQI MCSs to make some fields available to support 256-QAM. The network entity informs the UE of this change using RRC signaling.

In one embodiment, when the UE carries out aperiodic reporting, the UE uses CRC masking to indicate whether the CSI report is a legacy-type CSI report or a new-type CSI report (a report that accounts for the use of 256-QAM). In some embodiments, the new-type CSI report is limited to reporting higher signal-to-noise ratios. The Annex shows the TBS for Rel-12 256-QAM support.

The Rel-8 TBS design assumes that there are 120 REs per PRB pair available for PDSCH, for new carrier type, etc. In one embodiment, if the actual number of available REs is larger or smaller than 120, a TBS adjustment factor can be introduced to appropriately adjust the TBS so that the effective MCS is maintained. For 3GPP LTE implementations, the adjustment factor could be any one of the following factors: 1.1, 1.2, 1.3, 1.125, 1.25, 1.375, 1.5, 1.625, or 1.75. These factors correspond to approximately a 10%, 20%, 30%, 12.5% increase in the data rate relative to the legacy data rate. These values can be tied to: (1) the effective number of REs per PRB pair for the PDSCH considering at least one of the control, reference signals, PDSCH starting position, etc. ("n_PDSCH") or (2) the effective number of REs per PRB pair for the enhanced PDSCH ("ePDSCH") considering at least one of the control, reference signals, ePDSCH starting position, etc. ("n_ePDSCH").

The UE determines a TBS column indicator representative of a number of RBs based on the number of allocated RBs, an adjustment factor, and a limiting factor. The TBS column indicator corresponds to a column in the TBS size table. The UE uses the TBS column indicator to obtain the TBS as described further below.

The UE determines the TBS column indicator by applying the adjustment factor to the number of allocated RBs and comparing the result to the limiting factor. If the result is greater than the limiting factor, then the TBS column indicator is set to correspond to the limiting factor. If the result is less than the limiting factor, then the TBS column indicator is set to correspond to the result. The TBS column indicator is a positive integer. Thus, if the result is not an integer, then the UE applies a ceiling function, a floor function, or a rounding operation on the result.

In an embodiment, the network entity signals the TBS adjustment factor to the UE using the PQI states. In another embodiment, the UE determines the TBS adjustment implicitly based on the n_PDSCH.

In one embodiment, method for a UE to process downlink transmissions from the network entity involves a UE transmitting a message (e.g., a CSI message) identifying a first type of modulation (e.g., 256-QAM) to a network entity and receiving, from the network entity, a first configuration message that indicates that the UE is to be configured to use the first type of modulation. In response to the first configuration message, the UE selects a first set of MCSs. The UE receives, from the network entity, a first DCI message (e.g., an enhanced DCI message). The first DCI message includes a designation of a first MCS. The message also includes an assignment of a first set of downlink RBs to the UE.

Based on the first MCS, the UE determines that it is to use the first type of modulation. The UE also determines a first TB size based on the first MCS and based on the first set of assigned downlink RBs. The UE receives a first downlink signal from the network entity and processes the first downlink signal using the first type of modulation and the first TB size.

In some embodiments, the first set of MCSs is represented by a first MCS table. The first DCI message identifies the first MCS using an index value of the first MCS table. The UE determines the TBS by referencing the first MCS table with the MCS index value to obtain a TBSI value. The UE also references a TBS table with the TBSI value to obtain the first TBS.

In an embodiment, the UE receives a second configuration message from the network entity, selects a second set of MCSs in response to the second configuration message, and receives from the network entity, a second DCI message (e.g., a legacy DCI message). The second DCI message includes a designation of a second MCS. The second MCS is one of the second set of MCSs. The second DCI also includes an assignment of a second set of downlink RBs to the UE. The UE determines, based on the second MCS, that the UE is to use a second type of modulation (e.g., 64-QAM). The UE also determines a second TBS based on the second MCS and the second set of assigned downlink RBs, receives a second downlink signal from the network entity, and processes the second downlink signal using the second type of modulation and the second TBS.

In some embodiments, the UE transmits a CQI to the network entity. The CQI identifies a recommended MCS (e.g., an enhanced MCS) of the first set of MCSs. The UE transmits another CQI to the network entity that identifies a recommended MCS (e.g., a legacy MCS) of the second set of modulation and coding schemes. Each CQI can be masked with a different mask.

To determine the TBS, the UE can reference an MCS table with the MCS index value to obtain a TBSI value, and reference a TB table using the TBSI value and using the number of the first set of assigned RBs.

In some embodiments, the TB table includes at least one of the rows of the following table:

| ITBS | RB = 1 | RB = 2 | RB = 3 | RB = 4 | RB = 5 | RB = 6 | RB = 7 | RB = 8 | RB = 9 | RB = 10 |
| --- | --- | --- | --- | --- | --- | --- | --- | --- | --- | --- |
| Index1 | 744 | 1544 | 2344 | 3112 | 3880 | 4584 | 5352 | 6200 | 6968 | 7736 |
| Index2 | 776 | 1608 | 2408 | 3240 | 4008 | 4776 | 5736 | 6456 | 7224 | 7992 |

-continued

| ITBS | RB = 1 | RB = 2 | RB = 3 | RB = 4 | RB = 5 | RB = 6 | RB = 7 | RB = 8 | RB = 9 | RB = 10 |
|---|---|---|---|---|---|---|---|---|---|---|
| Index3 | 808 | 1608 | 2472 | 3240 | 4136 | 4968 | 5736 | 6456 | 7480 | 8248 |
| Index4 | 840 | 1672 | 2536 | 3368 | 4264 | 5160 | 5992 | 6712 | 7736 | 8504 |
| Index5 | 872 | 1800 | 2664 | 3624 | 4392 | 5352 | 6200 | 7224 | 7992 | 8760 |
| Index6 | 904 | 1864 | 2792 | 3752 | 4584 | 5544 | 6456 | 7480 | 8248 | 9144 |
| Index7 | 968 | 1928 | 2856 | 3880 | 4776 | 5736 | 6712 | 7736 | 8760 | 9528 |
| Index8 | 100 | 2024 | 2984 | 4008 | 5160 | 5992 | 6968 | 7992 | 9144 | 10296 |
| Index9 | 1032 | 2088 | 3240 | 4264 | 5352 | 6456 | 7480 | 8504 | 9528 | 10680 |
| Index10 | 1096 | 2216 | 3240 | 4392 | 5544 | 6456 | 7736 | 8760 | 9912 | 11064 |
| Index11 | 1128 | 2280 | 3496 | 4584 | 5736 | 6968 | 7992 | 9144 | 10296 | 11448 |
| Index12 | 1192 | 2408 | 3624 | 4776 | 5992 | 7224 | 8504 | 9528 | 11064 | 12216 |
| Index13 | 1224 | 2472 | 3752 | 4968 | 6200 | 7480 | 8760 | 9912 | 11448 | 12576 | wherein IndexN is an arbitrary index number. IndexN may fall in order with other IndexN values (e.g., 27, 28, . . . 38, 39) or fall out of order (13, 39, 15, 2, etc.).

In an embodiment of the disclosure, a UE processes downlink signals received from the network entity by transmitting, to the network entity, a message identifying a type of modulation; receiving, from the network entity, a configuration message indicating that the UE is to be configured to use the identified modulation type; and receiving, from the network entity, a first DCI message. The first DCI message includes an RB assignment and a first jointly coded value. The UE determines, based on the RB assignment and on the first jointly coded value, a type of modulation and a TBS. The UE processes the downlink signal using the determined type of modulation and the determined TBS. The first jointly coded value may be an MCS index value jointly coded with an RV.

In some embodiments, the wireless network supports multiple legacy modulation types as well as one or more enhanced modulation types. The first jointly coded value may include an MCS index value jointly coded with a RV, in which the value falls within a predetermined range of values. A first set of MCS index values in the range corresponds to a first set of RVs, a legacy modulation type, and a legacy TBSI value. A second set of values in the range corresponds to a second set of MCS index values, a second set of RVs, an enhanced modulation type, and an enhanced TBSI value. The first and second sets of RVs may or may not be equal.

In one embodiment, the first jointly coded value includes a set of PQI state parameters, and the set of PQI parameters includes a reference to an MCS index value.

In another embodiment of the disclosure, a UE receives a DCI message that includes a resource assignment for a TB, an MCS index for the TB, and a transmission-rank indicator that indicates a number of spatial layers to which the TB is mapped. The UE determines that the TB is mapped to four layers based on the transmission-rank indicator. The UE acquires a first block size based on the resource assignment and the MCS index and determines a TBS for the TB based on the acquired block size and a translation mapping. The UE receives a downlink transmission associated with the DCI message and decodes the received transmission based on the determined TBS.

According to an embodiment, the UE receives, from the network entity, a second DCI message that has a second jointly coded value. The first jointly coded value has a first set of PQI parameters, and the second jointly coded value has a second set of PQI parameters. The first set of PQI parameters for the network entity includes a reference to a legacy MCS table, and the second set of PQI parameters includes a reference to an enhanced MCS table. The UE references the legacy MCS table using a legacy MCS index value to obtain a legacy modulation type and references the enhanced MCS table using an enhanced MCS index value to obtain an enhanced modulation type.

In other embodiments, the UE sends a message indicating the support of 256-QAM on the downlink and receives a configuration message from a network entity. The configuration information indicates the enabling of 256-QAM on the downlink. The UE reports CSI based on an MCS, including at least one code point corresponding to a 256-QAM modulation scheme. The UE receives a DCI message from the network entity. The DCI has an MCS field and an RB assignment field. The UE determines what modulation order (e.g., 64-QAM or 256-QAM) to use for receiving downlink transmissions and what TBS it should use for receiving downlink transmissions. The UE makes these determinations based on at least one of the MCS field and the RB assignment field.

The UE can, for example, determine what the TBS index is based on the MCS field in the DCI format.

The TBS may be determined in a variety of ways. For example, it may be determined using at least one of the rows of the following table using the ITBS and the number of RBs (determined from the RB assignment field).

| ITBS | RB = 1 | RB = 2 | RB = 3 | RB = 4 | RB = 5 | RB = 6 | RB = 7 | RB = 8 | RB = 9 | RB = 10 |
|---|---|---|---|---|---|---|---|---|---|---|
| 27 | 744 | 1544 | 2344 | 3112 | 3880 | 4584 | 5352 | 6200 | 6968 | 7736 |
| 28 | 776 | 1608 | 2408 | 3240 | 4008 | 4776 | 5736 | 6456 | 7224 | 7992 |
| 29 | 808 | 1608 | 2472 | 3240 | 4136 | 4968 | 5736 | 6456 | 7480 | 8248 |
| 30 | 840 | 1672 | 2536 | 3368 | 4264 | 5160 | 5992 | 6712 | 7736 | 8504 |
| 31 | 872 | 1800 | 2664 | 3624 | 4392 | 5352 | 6200 | 7224 | 7992 | 8760 |
| 32 | 904 | 1864 | 2792 | 3752 | 4584 | 5544 | 6456 | 7480 | 8248 | 9144 |
| 33 | 968 | 1928 | 2856 | 3880 | 4776 | 5736 | 6712 | 7736 | 8760 | 9528 |
| 34 | 100 | 2024 | 2984 | 4008 | 5160 | 5992 | 6968 | 7992 | 9144 | 10296 |
| 35 | 1032 | 2088 | 3240 | 4264 | 5352 | 6456 | 7480 | 8504 | 9528 | 10680 |
| 36 | 1096 | 2216 | 3240 | 4392 | 5544 | 6456 | 7736 | 8760 | 9912 | 11064 |
| 37 | 1128 | 2280 | 3496 | 4584 | 5736 | 6968 | 7992 | 9144 | 10296 | 11448 |
| 38 | 1192 | 2408 | 3624 | 4776 | 5992 | 7224 | 8504 | 9528 | 11064 | 12216 |
| 39 | 1224 | 2472 | 3752 | 4968 | 6200 | 7480 | 8760 | 9912 | 11448 | 12576 |

In an embodiment of the disclosure, 256-QAM support can be enabled through joint coding of the MCS field with another field in the DCI. For example, the UE can send a message (to a network entity) indicating the support of 256-QAM on the downlink and receive, from the network entity, a configuration message indicating the enabling of 256-QAM on the downlink. The UE reports CSI based on an MCS, including at least one code point corresponding to a 256-QAM modulation scheme. The UE receives a DCI message from the network entity. The DCI includes an RB assignment field and a jointly coded second field.

The UE determines a modulation order and determines a TBS associated with a downlink transmission. The UE makes these determinations based on the jointly coded second field and on the RB assignment field. For example, the UE could, in this way, determine that the modulation order corresponds to 256-QAM.

The jointly coded second field can indicate an MCS and at least one of the following: (1) a PDSCH RE mapping and quasi co-location indicator field and (2) an RV indicator field.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. In a wireless network comprising a network entity, a method for a user equipment ("UE") to process downlink transmissions from the network entity, the method comprising:

transmitting, by the UE to the network entity, a message identifying a first type of modulation;

receiving, by the UE from the network entity, a first configuration message that indicates that the UE is to be configured to use the first type of modulation;

in response to the first configuration message, selecting a first set of modulation and coding schemes;

receiving, by the UE from the network entity, a first downlink control information message, wherein the first downlink control information message includes a designation of a first modulation and coding scheme and an assignment of a first set of downlink resource blocks to the UE, and wherein the first modulation and coding scheme is one of the first set of modulation and coding schemes;

determining, based on the first modulation and coding scheme, that the UE is to use the first type of modulation;

determining a first transport block size based on the first modulation and coding scheme and on the first set of assigned downlink resource blocks;

receiving a first downlink signal from the network entity; and processing the first downlink signal using the first type of modulation and the first transport block size.

2. The method of claim 1:

wherein the first set of modulation and coding schemes is represented by a first modulation and coding scheme table;

wherein the first downlink control information message identifies the first modulation and coding scheme using an index value of the first modulation and coding scheme table; and wherein determining the first transport block size comprises:

referencing the first modulation and coding scheme table with the modulation and coding scheme index value to obtain a transport block size index value; and referencing a transport block size table with the transport block size index value to obtain the first transport block size.

3. The method of claim 1 further comprising:

receiving a second configuration message from the network entity;

selecting a second set of modulation and coding schemes in response to the second configuration message;

receiving a second downlink control information message from the network entity, wherein the second downlink control information message comprises:

a designation of a second modulation and coding scheme wherein the second modulation and coding scheme is one of the second set of modulation and coding schemes; and an assignment of a second set of downlink resource blocks to the UE;

determining, based on the second modulation and coding scheme, that the UE is to use a second type of modulation;

determining a second transport block size based on the second modulation and coding scheme and on the second set of assigned downlink resource blocks;

receiving a second downlink signal from the network entity; and processing the second downlink signal using the second type of modulation and the second transport block size.

4. The method of claim 3:

wherein the first modulation and coding scheme is an enhanced modulation and coding scheme; and wherein the second modulation and coding scheme is a legacy modulation and coding scheme.

5. The method of claim 3:

wherein the first configuration message is an enhanced downlink control information message;

wherein the first type of modulation is 256-Quadrature Amplitude Modulation ("256-QAM");

wherein the second configuration message is legacy downlink control information message; and wherein the second type of modulation is different from the first type.

6. The method of claim 3 further comprising:

transmitting, to the network entity, a first channel quality indicator that identifies a recommended modulation and coding scheme of the first set of modulation and coding schemes; and transmitting, to the network entity, a second channel quality indicator that identifies a recommended modulation and coding scheme of the second set of modulation and coding schemes.

7. The method of claim 6:

wherein the modulation and coding scheme identified by the first channel quality indicator is an enhanced modulation and coding scheme; and wherein the modulation and coding scheme identified by the second channel quality indicator is a legacy modulation and coding scheme.

8. The method of claim 7 wherein the first channel quality indicator is masked with a first mask and the second channel quality indication is masked with a second mask.

9. The method of claim 1:

wherein the first downlink control information message includes a modulation and coding scheme index value;

wherein determining the first transport block size comprises:
  referencing a first modulation and coding scheme table with the modulation and coding scheme index value to obtain a transport block size index value; and
  referencing a transport block table with the transport block size index value and the number of the first set of assigned resource blocks; and
wherein the transport block table includes at least one row of:

| ITBS | RB = 1 | RB = 2 | RB = 3 | RB = 4 | RB = 5 | RB = 6 | RB = 7 | RB = 8 | RB = 9 | RB = 10 |
|---|---|---|---|---|---|---|---|---|---|---|
| Index1 | 744 | 1544 | 2344 | 3112 | 3880 | 4584 | 5352 | 6200 | 6968 | 7736 |
| Index2 | 776 | 1608 | 2408 | 3240 | 4008 | 4776 | 5736 | 6456 | 7224 | 7992 |
| Index3 | 808 | 1608 | 2472 | 3240 | 4136 | 4968 | 5736 | 6456 | 7480 | 8248 |
| Index4 | 840 | 1672 | 2536 | 3368 | 4264 | 5160 | 5992 | 6712 | 7736 | 8504 |
| Index5 | 872 | 1800 | 2664 | 3624 | 4392 | 5352 | 6200 | 7224 | 7992 | 8760 |
| Index6 | 904 | 1864 | 2792 | 3752 | 4584 | 5544 | 6456 | 7480 | 8248 | 9144 |
| Index7 | 968 | 1928 | 2856 | 3880 | 4776 | 5736 | 6712 | 7736 | 8760 | 9528 |
| Index8 | 100 | 2024 | 2984 | 4008 | 5160 | 5992 | 6968 | 7992 | 9144 | 10296 |
| Index9 | 1032 | 2088 | 3240 | 4264 | 5352 | 6456 | 7480 | 8504 | 9528 | 10680 |
| Index10 | 1096 | 2216 | 3240 | 4392 | 5544 | 6456 | 7736 | 8760 | 9912 | 11064 |
| Index11 | 1128 | 2280 | 3496 | 4584 | 5736 | 6968 | 7992 | 9144 | 10296 | 11448 |
| Index12 | 1192 | 2408 | 3624 | 4776 | 5992 | 7224 | 8504 | 9528 | 11064 | 12216 |
| Index13 | 1224 | 2472 | 3752 | 4968 | 6200 | 7480 | 8760 | 9912 | 11448 | 12576. |

10. The method of claim 1:
wherein the message identifying a first type of modulation is a channel state information message that includes information regarding the quality of the link between the UE and the network entity; and
wherein the first type of modulation is 256-QAM.

11. In a wireless network comprising a network entity, a method for a user equipment ("UE") to process downlink signals received from the network entity, the method comprising:
  transmitting, by the UE to the network entity, a message identifying a type of modulation;
  receiving, by the UE from the network entity, a configuration message indicating that the UE is to be configured to use the identified modulation type;
  receiving, by the UE from the network entity, a first downlink control information message that includes a resource block assignment and a first jointly coded value;
  determining, based on the resource block assignment and on the first jointly coded value, a type of modulation and a transport block size, wherein the determined modulation type is the same as the modulation type identified in the configuration message;
  receiving a downlink signal from the network entity; and
  processing the downlink signal using the determined type of modulation and the determined transport block size.

12. The method of claim 11 wherein the first jointly coded value comprises a modulation and coding scheme index value jointly coded with a redundancy version.

13. The method of claim 11:
  wherein the wireless network supports a plurality of legacy modulation types and an enhanced modulation type;
  wherein the first jointly coded value includes a modulation and coding scheme index value jointly coded with a redundancy version;
  wherein the first jointly coded value falls within a predetermined range of values;
  wherein a first set of values of the predetermined range corresponds to a first set of modulation and coding scheme index values, a first set of redundancy versions, a legacy modulation type, and a legacy transport block size index value; and
  wherein a second set of values of the predetermined range corresponds to a second set of modulation and coding scheme index values, a second set of redundancy versions, an enhanced modulation type, and an enhanced transport block size index value.

14. The method of claim 13 wherein the first and second redundancy version sets are equal.

15. The method of claim 13 wherein the first and second redundancy version sets are not equal.

16. The method of claim 11:
  wherein the first jointly coded value includes a set of Physical Downlink Shared Channel Resource Element mapping and Quasi-CoLocation ("PQI") state parameters; and
  wherein the set of PQI parameters includes a reference to a modulation and coding scheme index value.

17. A method for a user equipment ("UE") to receive a downlink transmission from a wireless network entity, the method comprising:
  receiving, by the UE, a downlink control information message that includes a resource assignment for a transport block, a modulation and coding scheme index for the transport block, and a transmission rank indicator indicating a number of spatial layers to which the transport block is mapped;
  determining, based on the transmission rank indicator, that the transport block is mapped to four layers;
  acquiring, based on the resource assignment and on the modulation and coding scheme index, a first block size;
  determining, based on the acquired block size and on a translation mapping, a transport block size for the transport block, wherein the translation mapping includes accessing a pair of values corresponding to at least one row of:

| First block size | Transport block size |
|---|---|
| 76208 | 305920 |
| 78704 | 314832 |
| 81176 | 324336 |
| 84760 | 339056 |
| 87936 | 351224 |
| 90816 | 363280 |
| 93800 | 375392 |
| 97896 | 391600 |
| 101840 | 405728 |
| 105528 | 422200 |
| 110136 | 440560 |

-continued

| First block size | Transport block size |
|---|---|
| 115040 | 460176 |
| 119816 | 478400 |
| 124464 | 496568 |
| 128496 | 51400 |
| 133208 | 532848 |
| 137792 | 545016 | receiving a downlink transmission associated with the downlink control information message; and decoding the received transmission based on the determined transport block size.

18. In a wireless network environment comprising a network entity, a user equipment ("UE") comprising:
a transceiver configured to:
transmit, to the network entity, a message identifying a first type of modulation;
receive, from the network entity, a first configuration message that indicates that the UE is to be configured to use the first type of modulation;
receive, from the network entity, a first downlink signal; and
receive, from the network entity, a first downlink control information message, wherein the first downlink control information message includes a designation of a first modulation and coding scheme and an assignment of a first set of downlink resource blocks to the UE; and
a processor communicatively linked to the transceiver and configured to:
select, in response to the first configuration message, a first set of modulation and coding schemes, wherein the first modulation and coding scheme is one of the first set of modulation and coding schemes;
determine, based on the first modulation and coding scheme, that the UE is to use the first type of modulation;
determine, based on the first modulation and coding scheme and on the first set of assigned downlink resource blocks, a first transport block size; and
process the received signal using the first type of modulation and the first transport block size.

19. The UE of claim 18:
wherein the first set of modulation and coding schemes is represented by a first modulation and coding scheme table;
wherein the first downlink control information message identifies the first modulation and coding scheme using an index value of the first modulation and coding scheme table; and
wherein the processor is further configured to:
reference the first modulation and coding scheme table with the modulation and coding scheme index value to obtain a transport block size index value; and
reference a transport block size table with the transport block size index value to obtain the first transport block size.

20. The UE of claim 18:
wherein the transceiver is further configured to:
receive a second configuration message from the network entity;
receive a second downlink control information message from the network entity, wherein the second downlink control information message includes a designation of a second modulation and coding scheme, the second modulation and coding scheme being one of the second set of modulation and coding schemes, and an assignment of a second set of downlink resource blocks to the UE; and
receive a second downlink signal from the network entity; and
wherein the processor is further configured to:
select a second set of modulation and coding schemes in response to the second configuration message;
determine, based on the second modulation and coding scheme, that the UE is to use a second type of modulation;
determine a second transport block size based on the second modulation and coding scheme and the second set of assigned downlink resource blocks; and
process the second downlink signal using the second type of modulation and the second transport block size.

* * * * *